(12) United States Patent  (10) Patent No.: US 8,196,868 B2
Kutter et al.  (45) Date of Patent: Jun. 12, 2012

(54) CRYOGENIC PROPELLANT DEPOT AND INTEGRAL SUNSHIELD

(75) Inventors: Bernard Friedrich Kutter, Centennial, CO (US); Frank Charles Zegler, Centennial, CO (US); Mohamed R. Ragab, Greenwood Village, CO (US)

(73) Assignee: United Launch Alliance, LLC, Englewood, CO (US)

( * ) Notice: Subject to any disclaimer, the term of this patent is extended or adjusted under 35 U.S.C. 154(b) by 0 days.

(21) Appl. No.: 13/340,310

(22) Filed: Dec. 29, 2011

(65) Prior Publication Data

US 2012/0091280 A1   Apr. 19, 2012

Related U.S. Application Data

(63) Continuation of application No. 12/359,015, filed on Jan. 23, 2009, now abandoned.

(51) Int. Cl.
*B64G 1/52* (2006.01)
*B64G 1/58* (2006.01)
*B64G 1/00* (2006.01)

(52) U.S. Cl. ............... 244/171.7; 244/172.3; 244/172.5; 244/158.1

(58) Field of Classification Search ............... 244/159.4, 244/158.1, 171.7, 172.2, 172.3, 172.4, 172.5, 244/172.7
See application file for complete search history.

(56) References Cited

U.S. PATENT DOCUMENTS

| | | | |
|---|---|---|---|
| 3,477,662 A * | 11/1969 | Anderson | 244/172.7 |
| 4,314,682 A | 2/1982 | Barnett et al. | |
| 5,044,579 A | 9/1991 | Bernasconi et al. | |
| 5,080,306 A * | 1/1992 | Porter et al. | 244/171.7 |
| 5,161,756 A * | 11/1992 | Redmon et al. | 244/171.7 |
| 5,474,262 A * | 12/1995 | Fiore | 244/159.4 |
| 6,481,671 B1 * | 11/2002 | Blair | 244/168 |
| 6,508,036 B1 | 1/2003 | Cadogan et al. | |
| 6,568,640 B1 * | 5/2003 | Barnett | 244/158.3 |
| 6,735,920 B1 | 5/2004 | Cadogan | |
| 6,739,555 B2 * | 5/2004 | Mazanek et al. | 244/172.4 |
| 7,270,304 B2 * | 9/2007 | Dailey et al. | 244/172.6 |
| 7,401,752 B2 * | 7/2008 | Lundgren et al. | 244/171.7 |
| 7,413,148 B2 * | 8/2008 | Behrens et al. | 244/172.2 |
| 7,559,508 B1 * | 7/2009 | Taylor et al. | 244/172.2 |
| 7,559,509 B1 * | 7/2009 | Kistler et al. | 244/172.3 |
| 7,575,200 B2 * | 8/2009 | Behrens et al. | 244/172.3 |
| 7,837,154 B2 * | 11/2010 | Trabandt et al. | 244/159.1 |
| 2004/0035120 A1 * | 2/2004 | Brunnhofer | 62/45.1 |
| 2006/0076459 A1 * | 4/2006 | Dailey et al. | 244/173.1 |
| 2007/0051854 A1 * | 3/2007 | Behrens et al. | 244/172.3 |
| 2008/0078884 A1 * | 4/2008 | Trabandt et al. | 244/171.7 |

(Continued)

OTHER PUBLICATIONS

U.S. Appl. No. 13/340,333, Kutter et al.

(Continued)

*Primary Examiner* — Timothy D Collins
*Assistant Examiner* — Steven Hawk
(74) *Attorney, Agent, or Firm* — Sheridan Ross, P.C.

(57) ABSTRACT

A cryogenic propellant depot and sunshield are provided for operation in earth orbit to fuel or refuel other space vehicles. The sunshield is deployed to effectively mitigate solar radiation emanating from the earth and the sun thereby providing a long term storage solution for cryogenic fluids prone to boil-off. The depot has supporting subsystems to include station keeping equipment and communication equipment so that the depot can be independently controlled. Inflatable booms are used to deploy the sunshield in a desired pattern around the depot.

11 Claims, 16 Drawing Sheets

U.S. PATENT DOCUMENTS

2010/0187364 A1   7/2010   Kutter et al.
2010/0187365 A1   7/2010   Kutter et al.

OTHER PUBLICATIONS

Arney et al., "Orbital Propellant Depots Enabling Lunar Architectures Without Heavy-Lift Launch Vehicles," Journal of Spacecraft and Rockets, Mar.-Apr. 2010, vol. 47, No. 2, pp. 353-360.

ATK Space Systems, "Telescoping Boom: Robust and Highly Reliable Linear Motion," date unknown, pp. 1-2, Goleta, California.

D. Murphy, "Deployable Apertures: An Extension of Unique Expertise in Deployables Membrane Technology," ATK Space Systems, Feb. 3, 2006, pp. 1-10.

Dallas Bienhoff, "LEO Propellant Depot: A Commercial Opportunity?" LEAG Private Sector Involvement, Oct. 1-5, 2007, pp. 1-13, Houston, Texas.

Dew et al. "Design and Development of an In-Space Deployable Sun Shield for Atlas Centaur," AIAA 2008-7764, Sep. 2008.

Frank Chandler et al., "Propellant Depots for Earth Orbit and Lunar Exploration," AIAA 2007-6081, AIAA Space 2007 Conference & Exposition, Sep. 18-20, 2007, Long Beach, California.

ILC Dover Products page for "Centaur Sun Shield," date unknown, available at http://ilc.mobiusnm.com/products_ad_se_rs_centaur_sun_shield.cfm, Aug. 31, 2011 in Official Action for U.S. Appl. No. 12/359,015.

ILC Dover, "Inflatable Decelerators and Aeroshells," pp. 1-8.

Kelly Young, "Orbiting Gas Stations Key to Interplanetary Exploration," New Scientist, Jun. 2, 2006, available at http://www.newscientist.com/article/dn9259.

Kutter et al. "A Practical, Affordable Cryogenic Propellant Depot Based on ULA's Flight Experience," AIAA 2008-7644, Sep. 2008.

Kutter et al. "Atlas Centaur Extensibility to Long-Duration In-Space Applications," AIAA 2005-6738, Sep. 2005.

Kutter et al. "Settled Cryogenic Propellant Transfer," AIAA 2006-4436, Nov. 2006.

Kutter et al. Presentation Slides for ULA Advanced Development, Aug. 28, 2007, available at http://spirit.as.utexas.edu/~fiso/telecon/Kutter_8-28-07.pdf, cover & pp. 19-26.

* cited by examiner

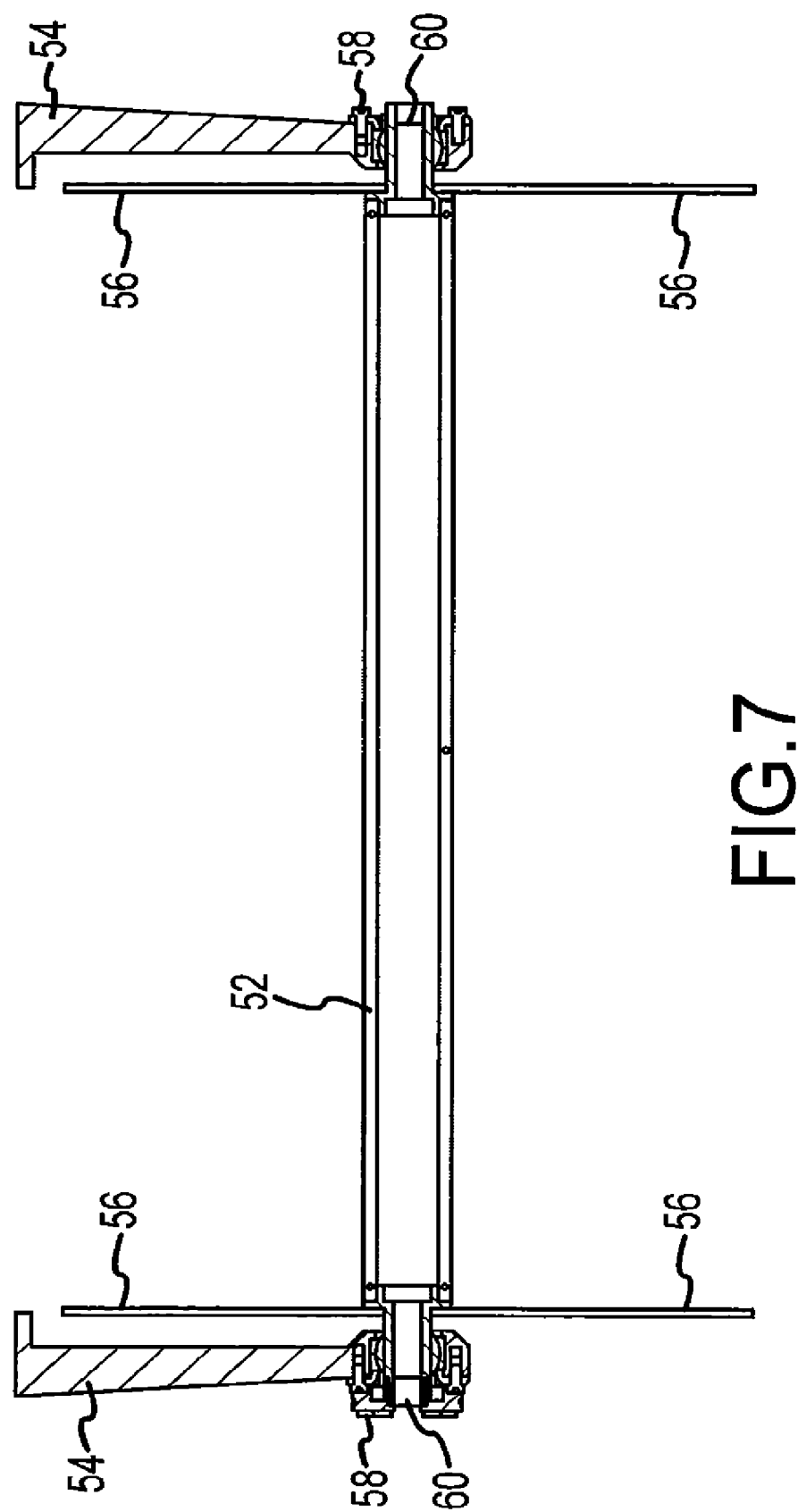

CRYOGENIC PROPELLANT DEPOT AND INTEGRAL SUNSHIELD

REFERENCE TO RELATED APPLICATIONS

This application is a continuation of U.S. patent application Ser. No. 12/359,015 filed on Jan. 23, 2009 and is hereby incorporated by reference in its entirety.

FIELD OF THE INVENTION

The present invention relates to cryogenic propellant depots used for the fueling of space vehicles in earth orbit, other orbits, deep space or near celestial bodies, and more particularly, to a cryogenic propellant depot placed in space having an integral sunshield to optimize storage of liquid cryogens by shielding the depot from solar radiation.

BACKGROUND OF THE INVENTION

Space exploration is limited by a number of factors that prohibit the distance to which space vehicles can travel from the earth to the rest of the solar system. One obvious limitation is the size of a payload that can be placed into earth orbit and beyond. Tremendous power and fuel requirements are required to place larger payloads into earth orbit, and to then project those payloads to other locations in the solar system, such as the moon or Mars. The proposed NASA Ares-5 rocket is capable of delivering approximately 69 tons to earth escape velocity. However, NASA's current architecture requires a minimum of 77 tons to complete a crewed lunar mission that includes travel to and from the moon back to earth. Design changes for existing rockets can be achieved, but not without great additional expense. Increasing the payload capacity of existing launch vehicles is required for extended space exploration to locations such as Mars missions.

One alternative for satisfying mission performance needs for extended space exploration contemplates the use of an on-orbit fueling station, that reduces the Earth to orbit launch vehicle performance requirements down to the capability of existing booster rockets, and also enables great flexibility in attending to the different types of space missions in the expanding space industry. Providing an orbital refueling station has been contemplated with some prior designs, such as by NASA and Boeing. These prior designs typically are large space "gas stations" storing both oxidizer (typically LO2) and fuel (typically LH2) requiring on orbit assembly of elements launched by numerous launch vehicles. These large space stations also typically rely on zero-gravity cryo fluid management requiring significant additional development. However, a need still exists for providing an orbiting propellant depot using existing or near term technology that can be easily integrated within existing payload fairings, is economically feasible, and provides a reliable design that minimizes potential failure modes based upon the duration of time in which the propellant depot would be operating in space.

SUMMARY OF THE INVENTION

In accordance with the present invention, a cryogenic propellant depot and integral sunshield are provided that can be launched from within an existing payload fairing on existing launch vehicles. The depot can reside in low earth orbit, and provides the capability to fuel/refuel many types of space vehicles. The proposed depot design also supports locations beyond low Earth orbit such as Earth-Moon Lagrange points, low lunar orbit, low Mars orbit or the lunar surface and is capable of supporting a wide range of space transportation architectures. Preferably, the depot would be launched empty and be fueled by additional propellant servicing launches.

The depot includes a relatively lightweight, cryogenic tank designed to contain a single fluid, either an oxidizer such as liquid oxygen, or fuel such as liquid hydrogen. The term "depot" when used alone hereinafter collectively refers to the invention comprising the tank and the sunshield as an integrated system. The cryogenic tank includes an equipment deck that contains a docking collar allowing the depot to connect to another space vehicle for transfer of cryogenic liquid. The depot would also include integral avionics, control valves for dispensing of the cryogen, station keeping propulsion equipment, and communications equipment. The depot may incorporate a propulsion system in the form of a rocket engine such that the depot itself constitutes an upper stage of the launch vehicle. The upper stage may carry a payload, such as a satellite. Thus the depot in this embodiment comprises three components: the upper stage, the shield, and the payload.

To minimize boil off of the liquid, a low conductivity support truss and thermal isolation gas reservoir is placed between the equipment deck and the tank. To minimize structural mass and maximize the depot propellant capacity within payload fairing envelopes, the thermal isolation gas reservoir and cryogenic tank share a common, insulated bulkhead.

The sunshield is stored on or adjacent to the equipment deck. Once the depot is in orbit, the sunshield is deployed around the cryogenic tank to thereby minimize heating from the sun and earth. The sunshield deflects radiated heat from these sources to deep space. The sunshield provides a passive, structurally reliable, and affordable solution to minimize boil off of the liquid within the tank.

Once the sunshield has been deployed, the entire depot slowly spins about its longitudinal axis to provide centrifugal acceleration. The station-keeping propulsion system is used to initiate and control this spin. The centrifugal acceleration provides positive gas/liquid separation by forcing liquid outward toward the tank sidewall, resulting in a gaseous ullage in the center of the tank. Cryogenic fuel management within the tank is greatly improved as the gaseous core may be more effectively vented than a liquid—gas slurry. This venting is similar to the settled ullage venting of existing cryogenic upper stages. Centrifugal settling also simplifies propellant acquisition and transfer, thereby avoiding the need for additional liquid acquisition devices that would otherwise be required to separate gas and liquid prior to liquid transfer. Propellant transfer into and out of the depot is accomplished by differential pressure between the tank and the receiving vehicle/tank; very similar to the manner in which launch vehicle engines are fueled on existing cryogenic stages.

The well insulated depot, by incorporation of the sunshield, the thermo-isolation gas reservoir, tank geometry and other heat reduction measures enables the depot to stop rotating for docking operations without concerns regarding excessive gas and liquid heating that otherwise might be a concern for a tank that was subject to increased boil-off because of its exposure to solar and earth heating.

Vented gas from the tank can be stored in the thermal isolation gas reservoir located at the front of the tank, or can be vented to vacuum. During quiescent operation, the reservoir is preferably maintained at just below tank pressure to ensure flow of boil-off gas from the tank to the gas reservoir. The reservoir serves as the last heat sink between the equipment deck and the tank. This reservoir also supplies gas for the reaction control system used to control the depot's attitude and position as well as positive pressure expulsion of liquids during propellant transfer.

The sunshield is an assembly comprising a plurality of sunshield panels or petals, arranged in pairs and deployed by pneumatic inflation devices or other method of linear actuation by inflation that extend the pairs of panels in a pre-designated configuration. Each of the sunshield elements/petals may have multiple layers of materials. When the sunshield is deployed, it forms a truncated cone-shape in which the end of the tank opposite the equipment deck remains exposed to deep space. When the sunshield is fully deployed, it conceals the tank when viewing the tank from the front (equipment deck) or side (a direction orthogonal to the longitudinal axis of the tank). When the depot is in orbit, the end of the depot with the equipment deck and docking port maintains a north or south ecliptic orientation that allows the sunshield to most effectively protect the tank from both the sun's and earth's radiation. The shield layers can be configured at slightly spaced angles to provide open passages to better direct thermal energy out to deep space and away from the propellant tank. Thus, radiation energy passing through any given sun shield layer will be preferentially directed down, toward the sun shield open end and out to deep space rather than being trapped and eventually heating the liquid cryogen.

By the robust design of the present cryogenic depot and integral sunshield, inter-planetary space missions are no longer limited by launch vehicle performance. Smaller, less costly launch vehicles can be used, and space explorations can be extended much farther into the solar system. The depot of the present invention enables near term implementation to support the diverse needs in the space industry, thereby reducing costs for all aspects of space utilization. Other features and advantages of the present invention will become more apparent from a review of the following detailed description, taken in conjunction with the drawings.

BRIEF DESCRIPTION OF THE DRAWINGS

FIG. 7 is a cross-section of a dispensing roller and mounting brackets;

DETAILED DESCRIPTION

In accordance with the present invention and in one aspect of the invention, it includes a combination of a cryogenic propellant tank and an integral sunshield. According to this first aspect, the propellant tank can be incorporated as the upper stage of a launch vehicle further including a propulsion system that can carry a payload such as a satellite. In another aspect of the invention as a subcombination, it may be considered a sunshield especially adapted for space vehicles. In yet another aspect of the invention as a subcombination, it may be considered a cryogenic propellant tank placed in orbit and especially adapted for fueling and refueling space vehicles. In another aspect of the invention, a method is provided for deploying a sunshield for a space vehicle. In yet another aspect of the invention, a method is provided for providing a readily accessible liquid within a cryogenic tank while in earth orbit for transfer to another space vehicle.

Figure 1:
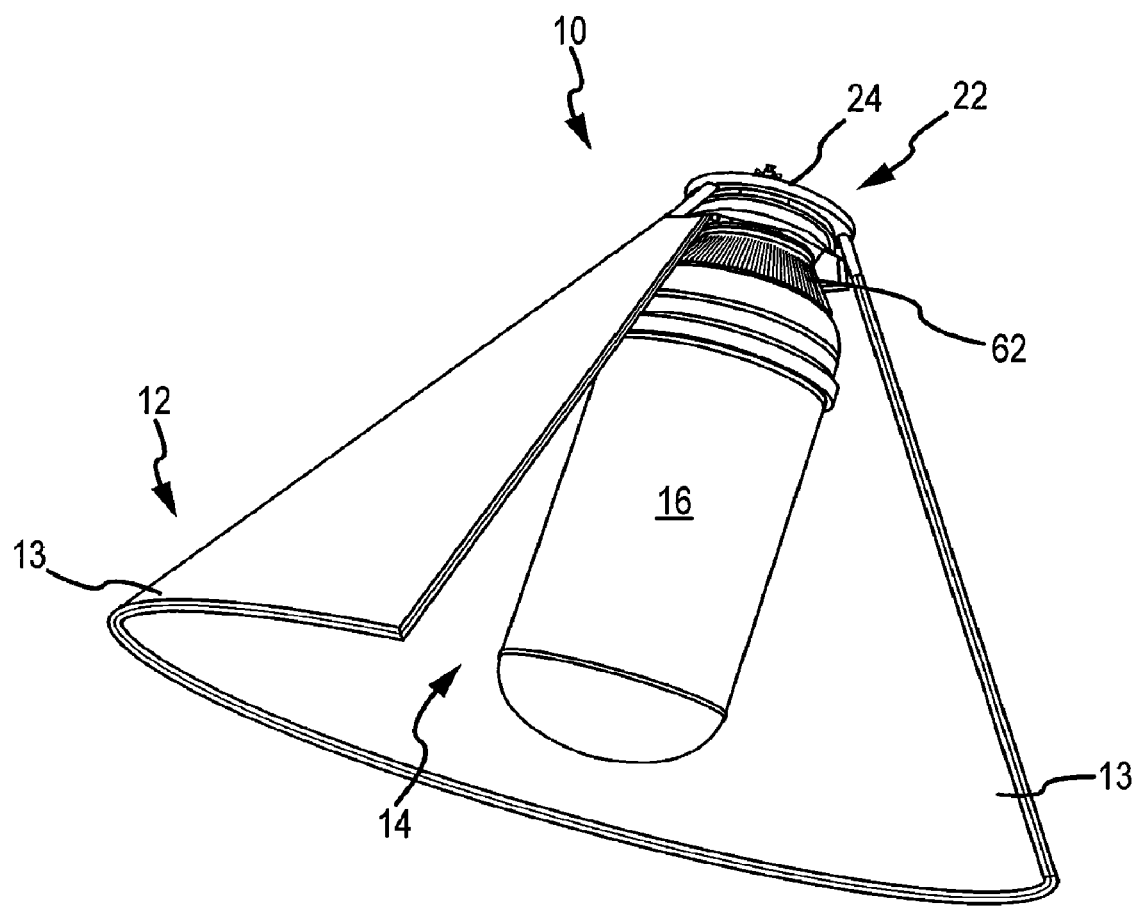
FIG. 1 is a fragmentary perspective view of the cryogenic depot and integral sunshield of the present invention in a first general embodiment.

FIG. 1 illustrates a first embodiment of the present invention including a cryogenic propellant depot and integral sunshield system 10. A sunshield 12 is secured to a cryogenic tank 14 that is placed into earth orbit by a launch vehicle (not shown). The sunshield 12 surrounds the tank to form a truncated cone shape. The sunshield is secured to the tank adjacent an equipment deck 24, and the sunshield extends beyond a length of the tank in a diverging fashion thus forming the cone shape. The sunshield 12 can have multiple layers of reflective material 13 to provide optimum protection to the tank 14. The shield is shown broken away in FIG. 1 to illustrate the covered tank 14. The open end of the sunshield provides a view factor to deep space allowing re-radiation of energy to the cold of deep space from the sun shield and tank.

Figure 2:
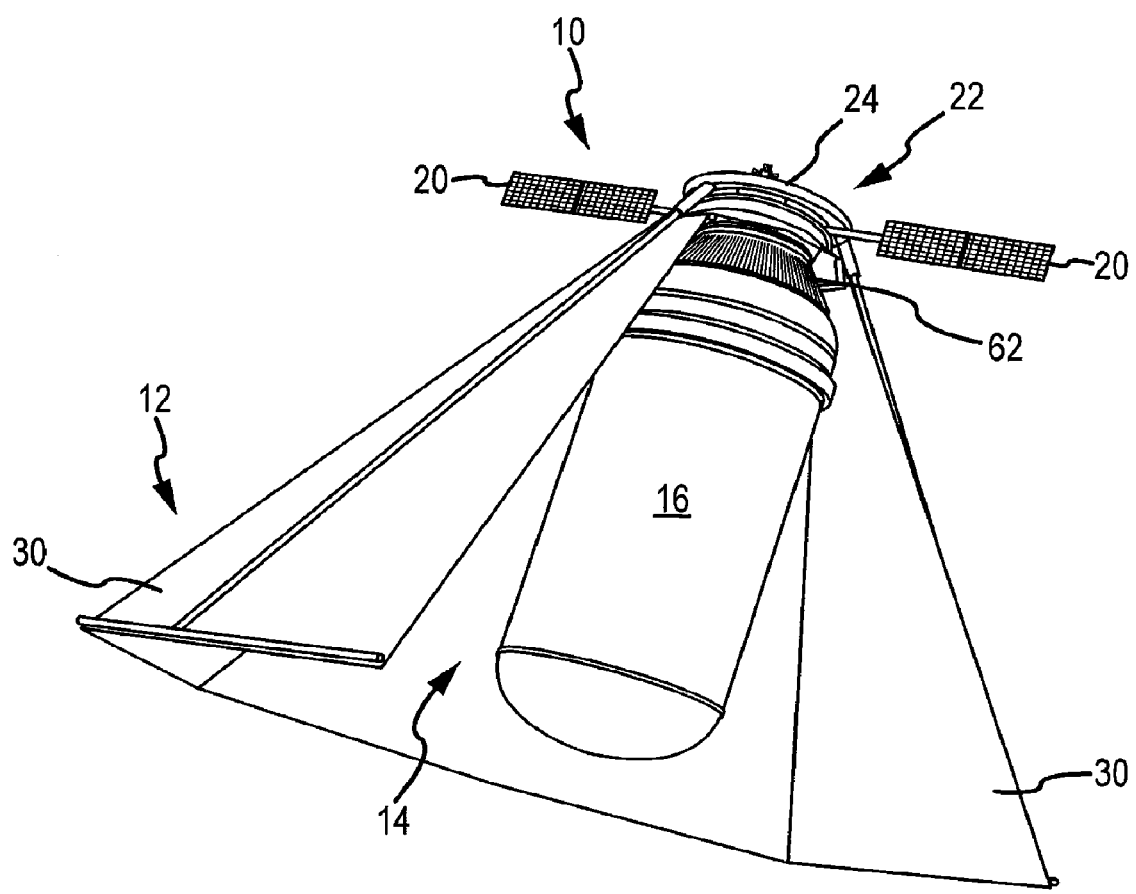
FIG. 2 is a fragmentary perspective view of the cryogenic depot and integral sunshield of the present invention in another embodiment including a segmented shield with individually deployable shield or panel segments.
Figure 3:
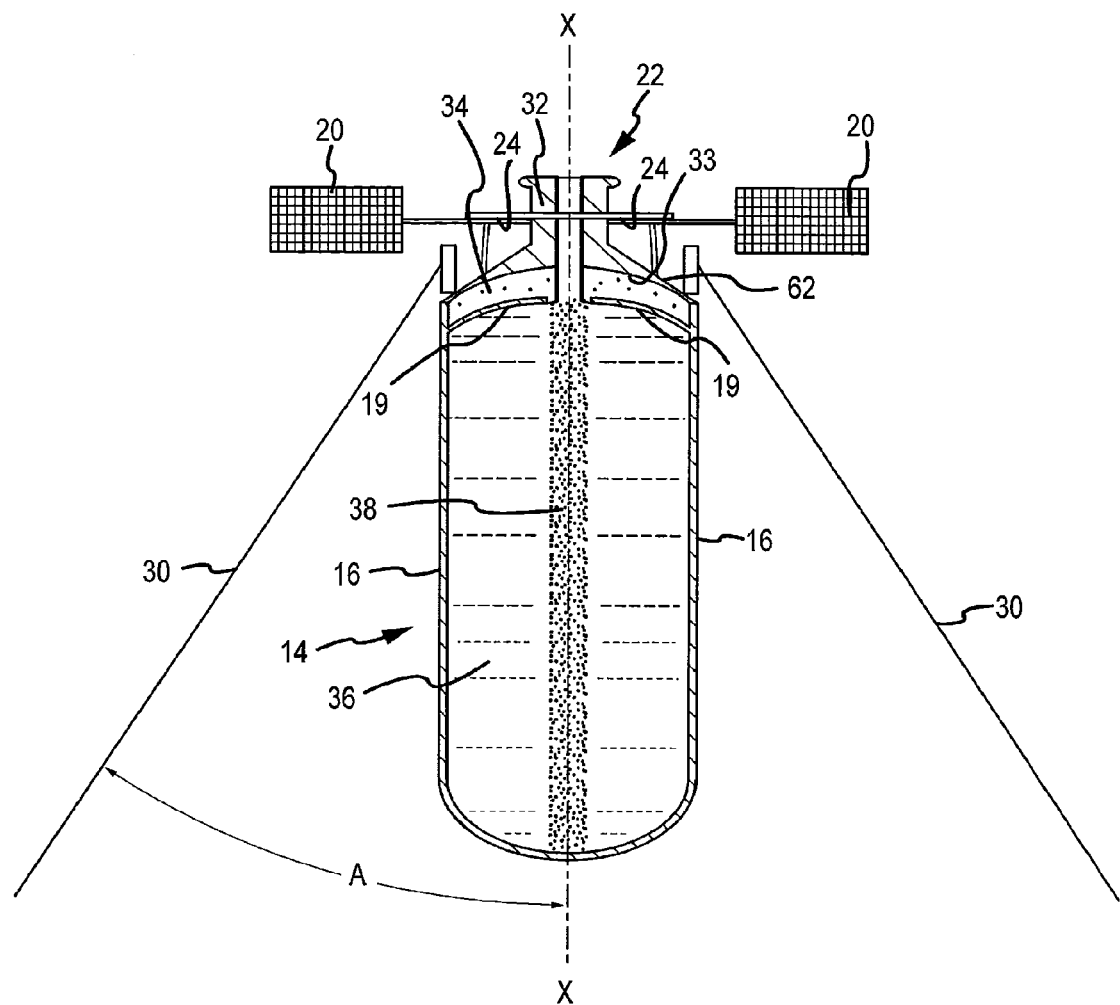
FIG. 3 is a simplified cross-section of the depot illustrating liquid gas separation within the tank, and the thermal isolation gas reservoir located between the forward bulkhead and the tank.

FIGS. 2 and 3 illustrate another preferred embodiment of the cryogenic propellant depot and integral sunshield system 10 of the present invention. In this embodiment, the sunshield 12 comprises a plurality of segments in the form of reflective panels or petals 30 that surround the tank 14 such that the panels when deployed form a truncated cone around the tank.

In FIG. 2, a few of the panels have also been removed in order to illustrate the tank 14 in its general orientation with the sunshield. Each of the panels is individually deployable, as set forth in more detail below.

The tank 14 preferably has a cylindrical sidewall 16, and is sized in length and circumference to fit within a designated payload fairing or launch vehicle outer mould line. Preferably, the tank is very thin walled which provides minimum structural mass, thermal mass and thermal conductivity to the rest of the depot. A docking port 22 is disposed at one end of the tank, along with the equipment deck 24 and at least one solar panel 20 that is used to provide power to the equipment deck 24. The equipment deck supports the avionics and other conventional(?) mechanical/electronic equipment (not shown) used to control functioning of the depot. More specifically, the equipment deck may support avionics that are used to navigate the depot, communications equipment allowing the depot to be controlled by radio communications with the earth, and control valve assemblies that are used to control the selective transfer of liquid from the tank to the docking port and gas transfer for tank pressure control. The equipment deck may further support conventional station-keeping equipment (not shown) that is used to maintain the depot in a desired orbit and orientation, as well as to provide rotation of the depot about its longitudinal axis. The station-keeping equipment may include a series of small propulsion jets that are spaced around a periphery of the equipment deck, and which are selectively fired to propel the depot, and to impart a desired spin about the longitudinal axis of the depot. These jets can use gas from the reservoir for reaction mass.

Referring to FIG. 3, a simplified schematic diagram is provided of a cross section of the tank and sunshield. The sunshield panels 30 extend away from the tank 14 at a desired angle A with respect to the longitudinal axis X-X of the tank. The propellant tank 14 has the sidewall 16 with one end 19 thereof that is covered by an attached bulkhead 33. A gap or space 34 exists between the end 19 of the tank 14 and the interior surface 33 of the bulkhead. This space 34 acts as a thermal isolation reservoir that thermally isolates the liquid 36 within the tank and helps to prevent heat from being transferred from the components attached to the equipment deck 24, such as the solar panels 20, avionics and the docking ring 22. The bulkhead 33 may have an intermediate low conductivity truss support 62 placed between the end of the bulkhead 33 and the equipment deck 24. This composite truss support 62 further helps to isolate liquid within the tank 16 from heat transfer by conduction through the equipment shelf 24.

FIG. 3 also illustrates that the liquid 36 within the tank is forced concentrically outward towards the sidewall 16 of the tank, and any gas 38 that is within the tank forms a core that extends along the longitudinal axis x-x of the tank and is centered within the tank. As mentioned, the station-keeping equipment provides a very slow rotation of the propellant tank about its longitudinal axis that separates the liquid and gas within the tank, and thus creates the gas core. As necessary, the gas core 38 may be vented to maintain desired pressures within the tank, and can be vented into the thermal isolation reservoir 34 or dumped overboard. This relatively cool gas from the reservoir 34 also helps to chill the thermal isolation reservoir to further prevent heat transfer to the liquid within the tank. Gas from the reservoir can be further used to vapor cool key parts of the depot to further reduce liquid heating.

Figure 4:
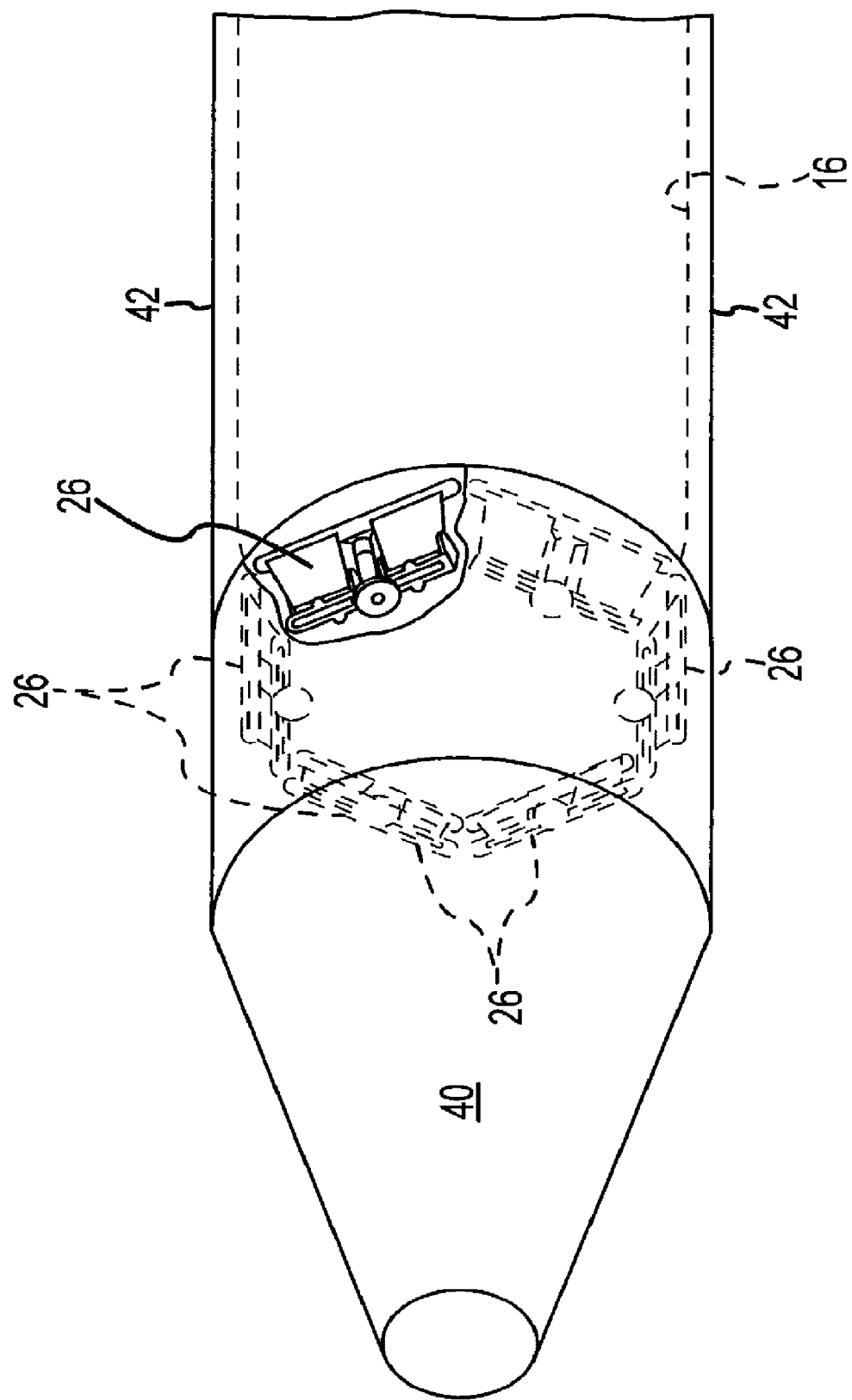
FIG. 4 is a fragmentary perspective view of the sunshield deployment assemblies as attached to the equipment deck and housed within the fairing of the launch vehicle during launch.

FIG. 4 illustrates the sunshield 12 when stowed within the launch vehicle. The sunshield in a preferred embodiment of the present invention includes six sunshield assemblies 26 that are disposed as shown around a periphery of the end of the tank. As shown, the arrangement of the assemblies 26 fit within the fairing envelope 40 that is longitudinally aligned with the upper stage 42 of the launch vehicle. In this figure, the tank is shown disposed within a launch vehicle fairing 42; however as mentioned, the depot can be constructed integral with the upper stage of a launch vehicle in which case the tank would include primary propulsion components.

Figure 5:
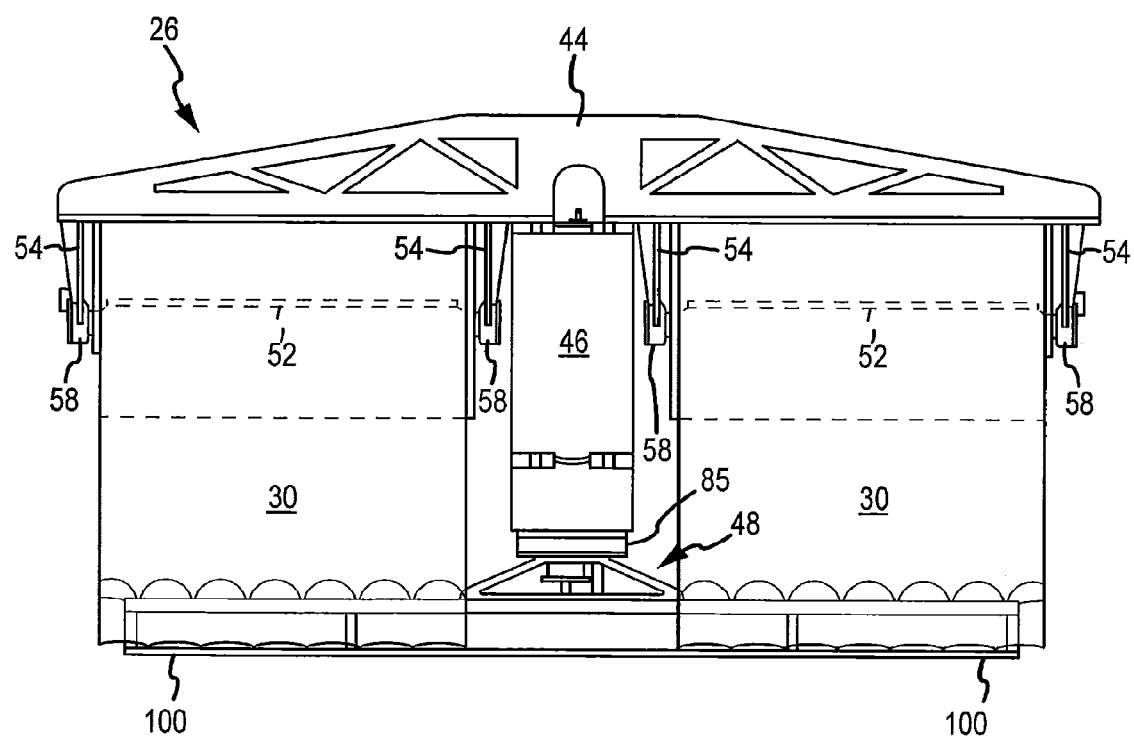
FIG. 5 is an elevation view of one of the sunshield assemblies as stowed.

Referring to FIG. 5, details are illustrated of one of the sunshield assemblies 26. An I-Beam mount 44 secures the assembly 26 to the equipment deck of the depot. The assembly 26 includes a pair of sunshield panels 30. Each of the panels 30 is stored in a rolled configuration about a corresponding roller 52 that extends from the I-Beam mount 44 by roller mounting brackets 54. The panels 30 are dispensed from their corresponding rollers 52 by an inflatable linear actuator device 70 disposed within an inflatable linear actuator sleeve 46, as discussed in more detail below with respect to FIGS. 8-10. The inflatable linear actuator houses an inflatable main boom that is progressively extended by pneumatic force which in turn causes the panels to unroll and extend. The distal or free ends of the panels 30 are secured to a cross boom or T-Boom 100. As discussed further below with respect to FIG. 8, the free end of the main boom 86 connects to an end cap 85. A connecting assembly 48 interconnects the end cap 85 and the cross boom 100. Once the main boom has fully deployed, then the T-Boom deploys in an orthogonal or transverse direction to laterally spread the panels 30 to their fully deployed polygon configuration.

Figure 6:
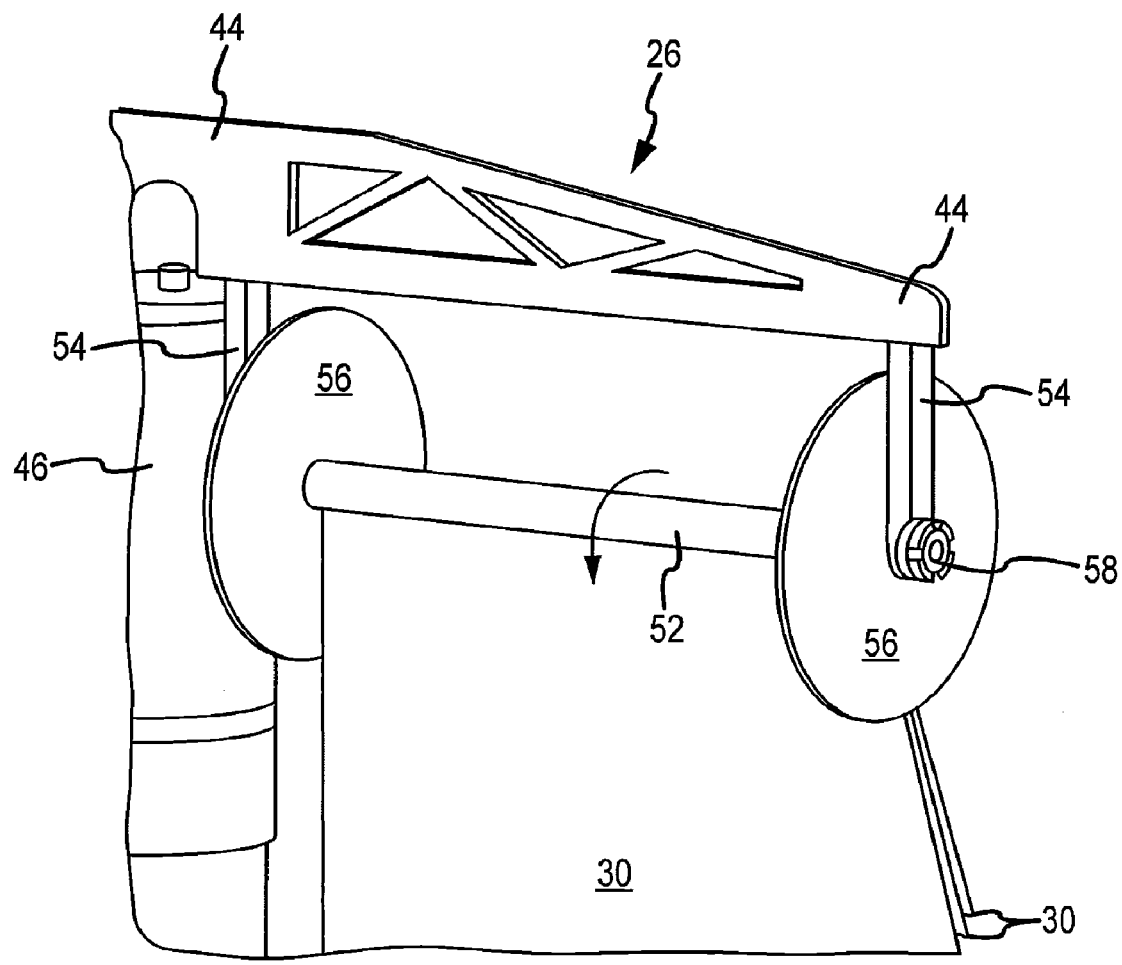
FIG. 6 is a simplified fragmentary perspective view illustrating a dispensing roller of a sunshield assembly after a sunshield panel has been deployed.

Referring to FIGS. 6 and 7, additional details are illustrated with respect to sunshield assembly 26. FIG. 6 illustrates one of the sun shield panels 30 after it has been fully unrolled from its roller 52. A pair of end platens 56 provides support to opposite lateral edges of the panel so that as the panel is unrolled, it maintains a linear deployment path. As also shown in FIG. 6, the panel 30 may include multiple layers of material depending upon the particular material used for the panel, as well as the shielding requirements for adequately shielding the tank. Examples of types of material that can be used for the panels include double aluminized Mylar® (DAM), double goldized Kapton® (DGK) or glass cloth— vacuum deposited gold (VDG). These materials have excellent reflective properties to effectively deflect radiation away from the sunshield in a directed pattern to deep space. Referring to FIG. 7, it is shown that the roller 52 extends between the roller mounting brackets 54, the platens 56 being spaced from the brackets 54, and each end of the roller 52 having an extension 60 that is received within a corresponding spherical bearing 58.

Figure 10:
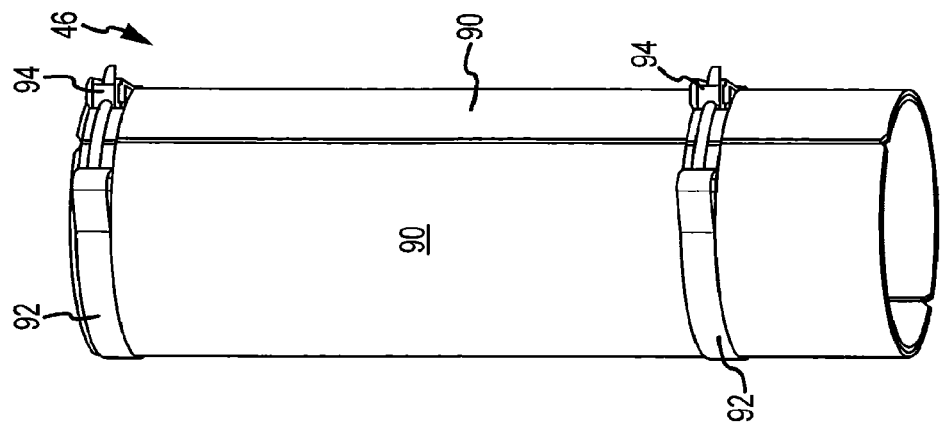
FIG. 10 is a perspective view of the sleeve that covers the inflatable linear actuator.
Figure 9:
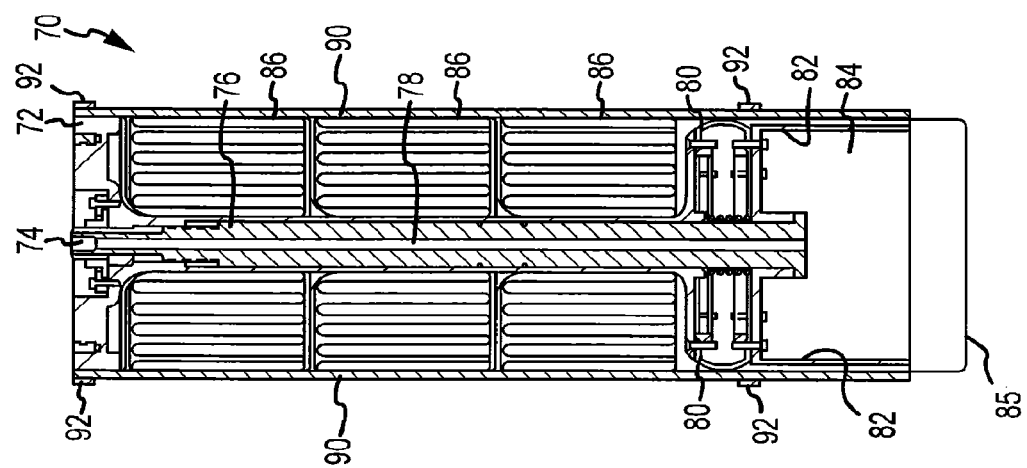
FIG. 9 is another cross-sectional view showing a sleeve covering the inflatable linear actuator to hold the main boom prior to deployment of the boom.
Figure 8:
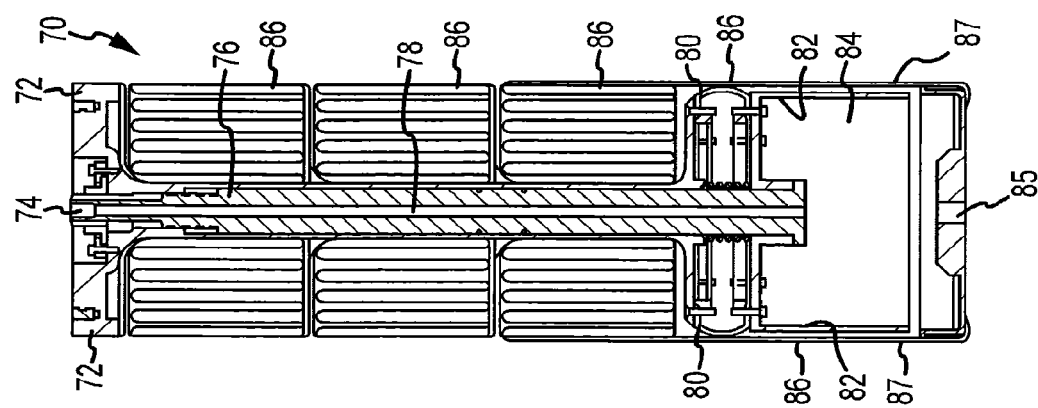
FIG. 8 is a cross-section of an inflatable linear actuator that houses a main boom prior to deployment of the panels.

Referring to FIGS. 8-10, the inflatable linear actuator 70 is shown along with the inflatable linear actuator sleeve 46 that covers the inflatable linear actuator. The inflatable linear actuator 70 houses the main boom 86 that is deployed to extend the pair of panels. The boom 86 is a flexible, gas impervious cylindrical member made of a material suitable for the space environment, such as PBI/Kevlar® with silicone coating. The main boom 86 is stowed in one or more (3 depicted) longitudinally spaced folded sections. Each of the sections is accordion folded in a concentric pattern so that as the boom is inflated, the outermost concentric folded layer is pulled away from the other concentric layers. The inflatable linear actuator device includes a rod 76, a base support 72 connected to the rod at one end, and a deployment guide disc 82 disposed at the other end. The boom 86 is held between the base support 72, disc 82 and the sleeve 46. A central aperture or passageway 78 extends through the rod. A port 74 communicating with the aperture 78 receives a source of compressed gas. This gas can be obtained from gas within the thermal isolation reservoir 34, or a dedicated gas source. The chamber 84 within the disc 82 receives the flow of gas through the aperture 78. End cap 85 is positioned beyond the distal end of the disc 84. The distal or free end 87 of the boom 86 extends over the disc 84 and is sealed to the end cap 85 so that when compressed air begins to fill the chamber 84, the end cap progressively displaces away from the inflatable linear actuator and the boom 86 is unfurled from its accordion folds. The distal folded section closest to the end cap 85 unfurls first, followed by the intermediate folded section, and then the proximal folded section unfurls. When fully inflated, the boom extends linearly away from the inflatable linear actuator 70 and in the direction in which the disc 82 is oriented. The disc 82 has a cylindrical shaped sidewall that orients the direction of boom displacement. FIG. 8 also shows an intermediate compressible element or gland 80 having a ring shape made of a flexible material such as Teflon. The gland 80 is compressed or loosened by a set screw to place a desired amount of pressure upon the interior surface of the boom 86 as the boom is inflated. The pressure placed by this intermediate gland assists in controlling the boom pressure and hence the speed of deployment of the boom. The multiple separate accordion folded sections are provided in order to more conveniently configure the boom for storage, and also to help overcome any additional frictional resistance that could otherwise be associated with the boom if it were stored in a single accordion fold. FIG. 10 illustrates the inflatable linear actuator sleeve 46 that extends concentrically over the packed main boom. As shown, the inflatable linear actuator sleeve may include two half sections 90 secured to one another by a pair of securing bands 92 and locks 94. As shown in FIG. 9, the installed sleeve 46 encloses the boom 86, but the end cap 85 remains exposed. The inflatable linear actuator sleeve protects the inflatable linear actuator and boom during transport and launch as well as ensuring a consistent boom pressure from the compressible gland 80 to ensure consistent deployment.

Figure 11:
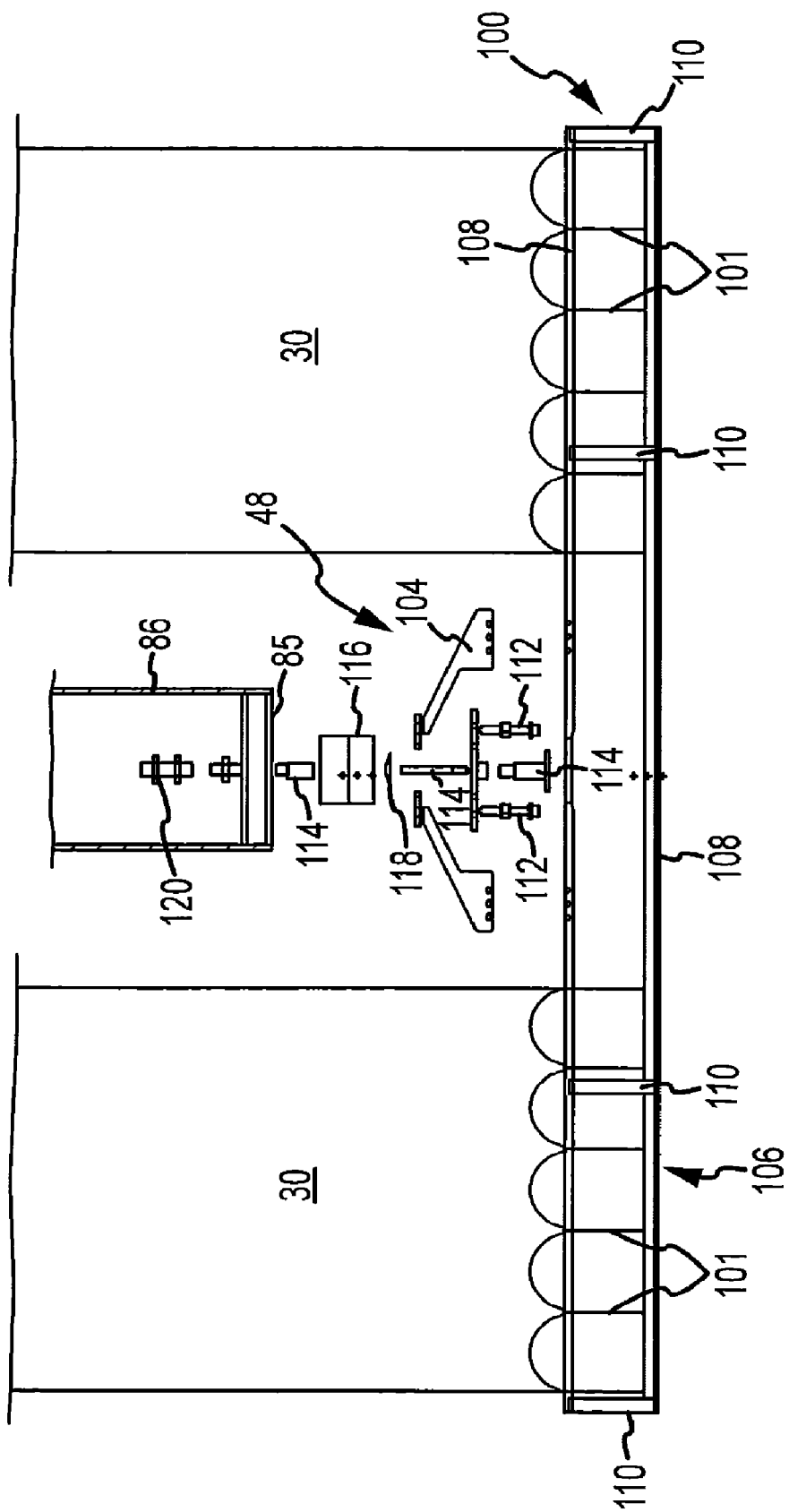
FIG. 11 is an exploded elevation view of components of the T-boom or cross boom assembly.
Figure 12:
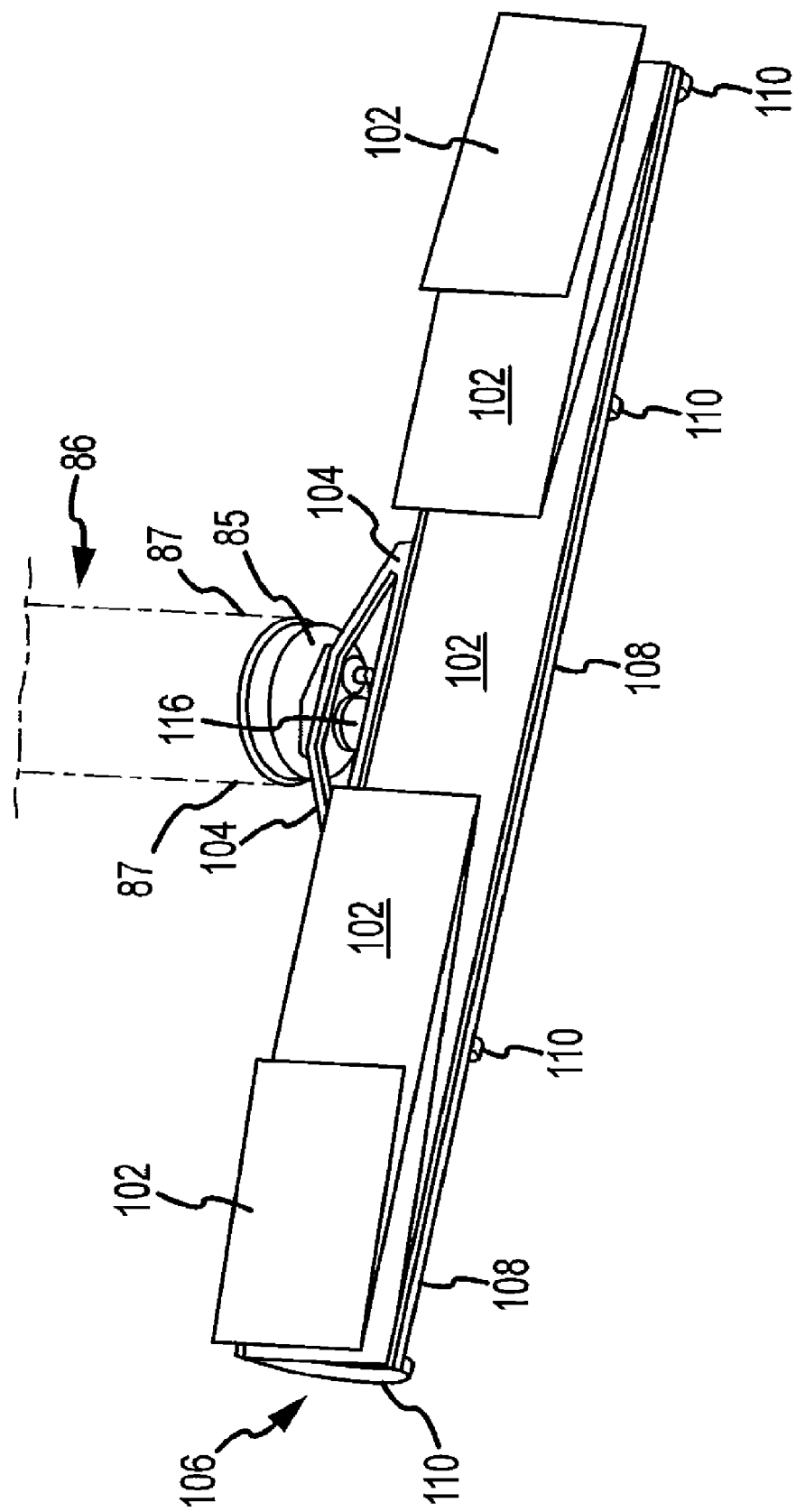
FIG. 12 is a perspective view of a cradle that houses the cross boom prior to deployment of the cross boom and the manner in which the cross boom is packed in the cradle.
Figure 13:
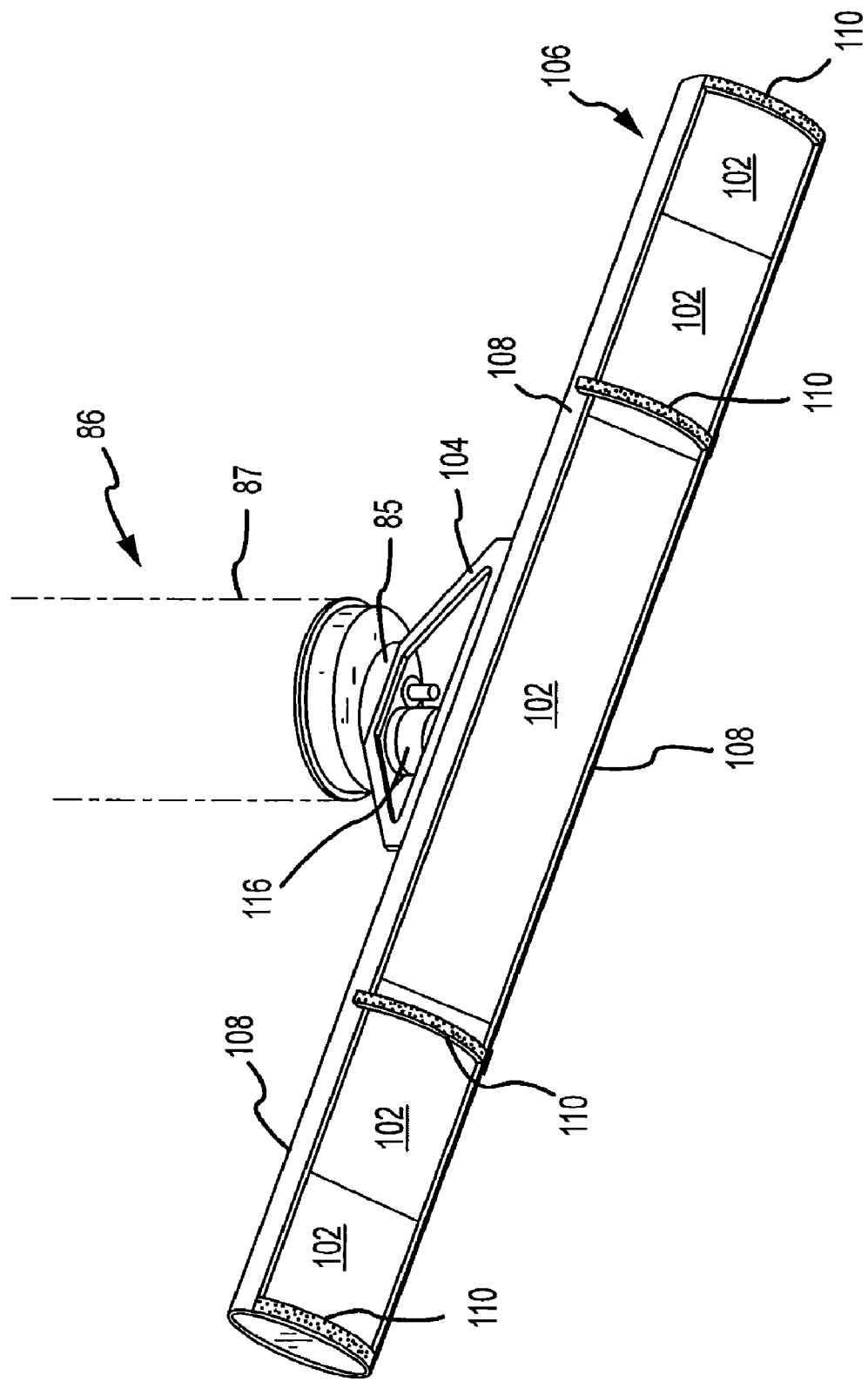
FIG. 13 is a perspective view illustrating the cross boom stowed within the cradle.

FIG. 11 illustrates the T-boom or cross boom cradle assembly 100. The cross boom cradle assembly 100 holds the cross boom 102, as illustrated in FIGS. 12 and 13. The cross boom is used to laterally expand the panels 30 to their fully deployed positions. FIG. 11 also illustrates some of the components of the connecting assembly 48 that interconnects the end cap 85 to the cross boom 100. Large bolts 112 attach brackets 104 to the end cap 85. The opposite ends of the brackets 104 attach to a surface of the cradle holder 108. Tube sections 114 enable gas to flow through the end cap 85 and into the cross boom for inflation of the cross boom. A rupture disc holder 116 receives a rupture disc 118 placed in the fluid path of the tube section 114. When the main boom is inflated, continued pressurization of the main boom will cause the rupture disc to rupture at a desired pressure, thereby enabling gas to flow into the cross boom for subsequent inflation of the cross boom. A check valve 120 is provided to prevent backflow of gas into the main boom once the main boom has been pressurized to a desired level. The panels 30 are attached to the cross boom assembly by D-rings 101 that are secured to the cross boom 102. The D-rings 101 are spaced along the widths of the panels 30 and attach to the free distal ends of the panels. The D-rings 101 hereby distribute the load of the panels evenly across the cross boom. It is noted in FIG. 11 that the gap between the panels 30 has been exaggerated in order to better illustrate the components of the assembly 48.

Referring to FIGS. 12 and 13, cradle 106 includes a half-cylinder shaped holder 108 and a plurality of flexible retaining straps 110 secured to the holder 108. The cross boom 102 is stowed in the cradle 106, and straps 110 hold the boom within the cradle. The straps may use hook and pile material to connect separate sections of strap material together or to connect the straps to the holder 108. The straps may be made from a resilient nylon material. The cross boom 102 is accordion folded with multiple sets of folds (two depicted), on each end. As gas enters the cross boom, straps sections 110 will separate from one another or the straps 110 will disconnect from the holder 108 by the pressure of the inflating boom 102. The boom continues to inflate and laterally extends the attached panels 30 to their fully deployed position. The independent panels can remain disconnected or be joined after deployment to provide improved structural integrity.

Figure 14:
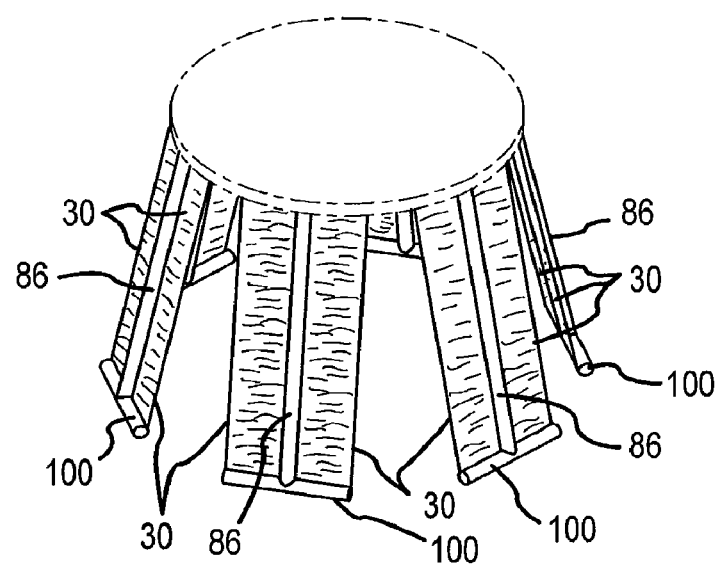
FIG. 14 is a simplified schematic perspective view of the sunshield as it begins to deploy by lengthening of the main boom.
Figure 15:
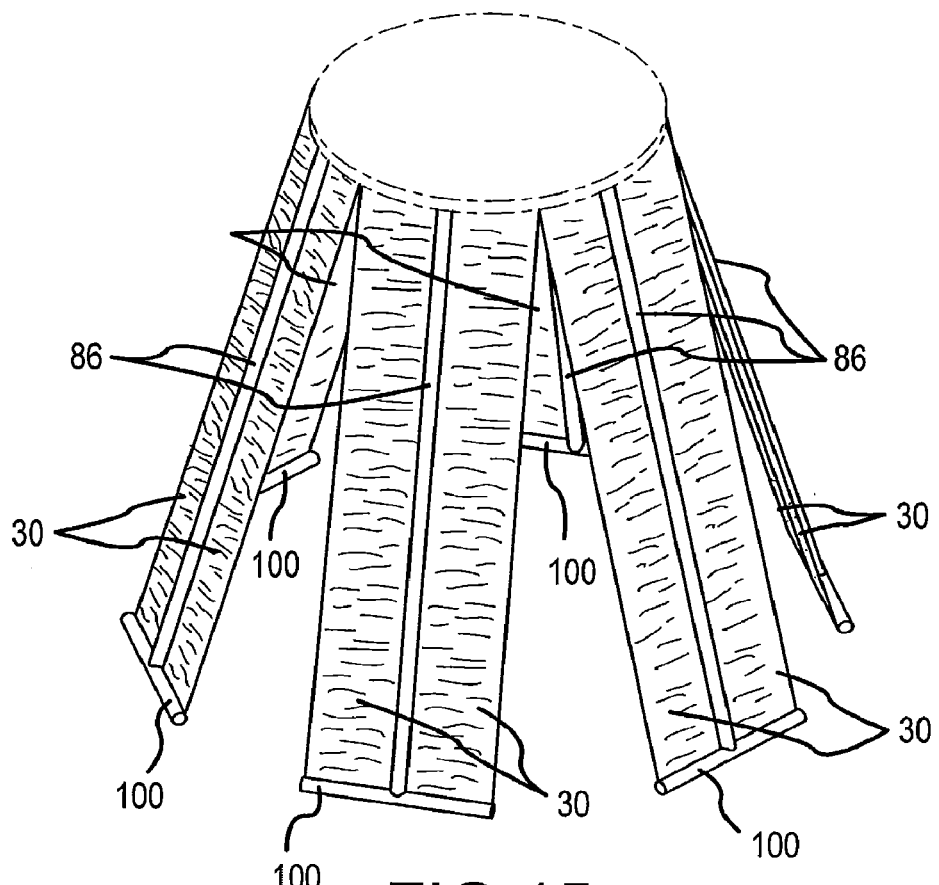
FIG. 15 is another simplified schematic perspective view of the sunshield when the main booms are fully deployed.
Figure 16:
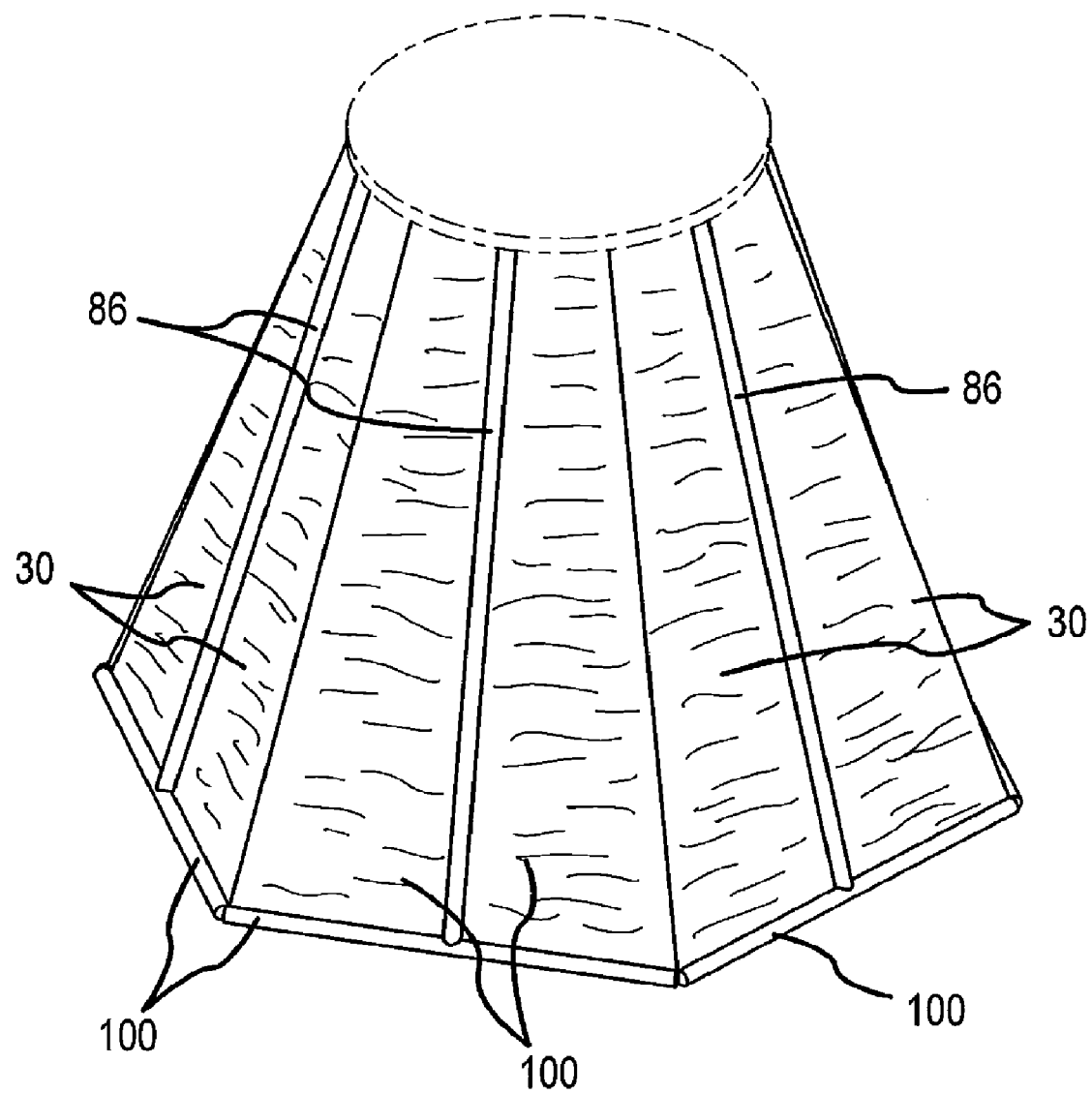
FIG. 16 is another simplified schematic perspective view showing the sunshield fully deployed by extension of the cross booms that laterally displaces the sunshield panels thereby closing the gaps between the panels.

Referring to FIGS. 14-16, the sunshield is illustrated in a sequence of deployment stages. Other components of the propellant depot have been omitted in these figures in order for clarity. In FIG. 14, the main booms 86 begin to deploy as gas is introduced through the respective inflatable linear actuators. The main booms 86 progressively unfurl from their accordion folded configurations. The dispensing rollers rotate to simultaneously unroll the panels 30 since the distal ends of the panels 30 are connected to the T-booms 102.

FIG. 15 illustrates the main booms 86 being fully deployed thereby extending the booms to their full length in a first direction. The panels also extend at the desired angle away from the longitudinal axis of the depot to thereby form the generally truncated cone shape. Depending upon the size and shape of the tank to be protected by the sunshield, as well as the particular orbit of the depot in space, the angled orientation of the sunshield can be modified to optimize radiation shielding. This orientation can be set prior to launch.

Referring to FIG. 16, the cross booms 102 inflate to expand the panels 30 in a lateral or transverse second direction to fill the longitudinally oriented gaps between facing panels 30 of adjacent assemblies 26. Since the booms are deployed in a near zero gravity environment, the booms will maintain their cone shaped orientation without the requirement of additional support.

Figure 17:
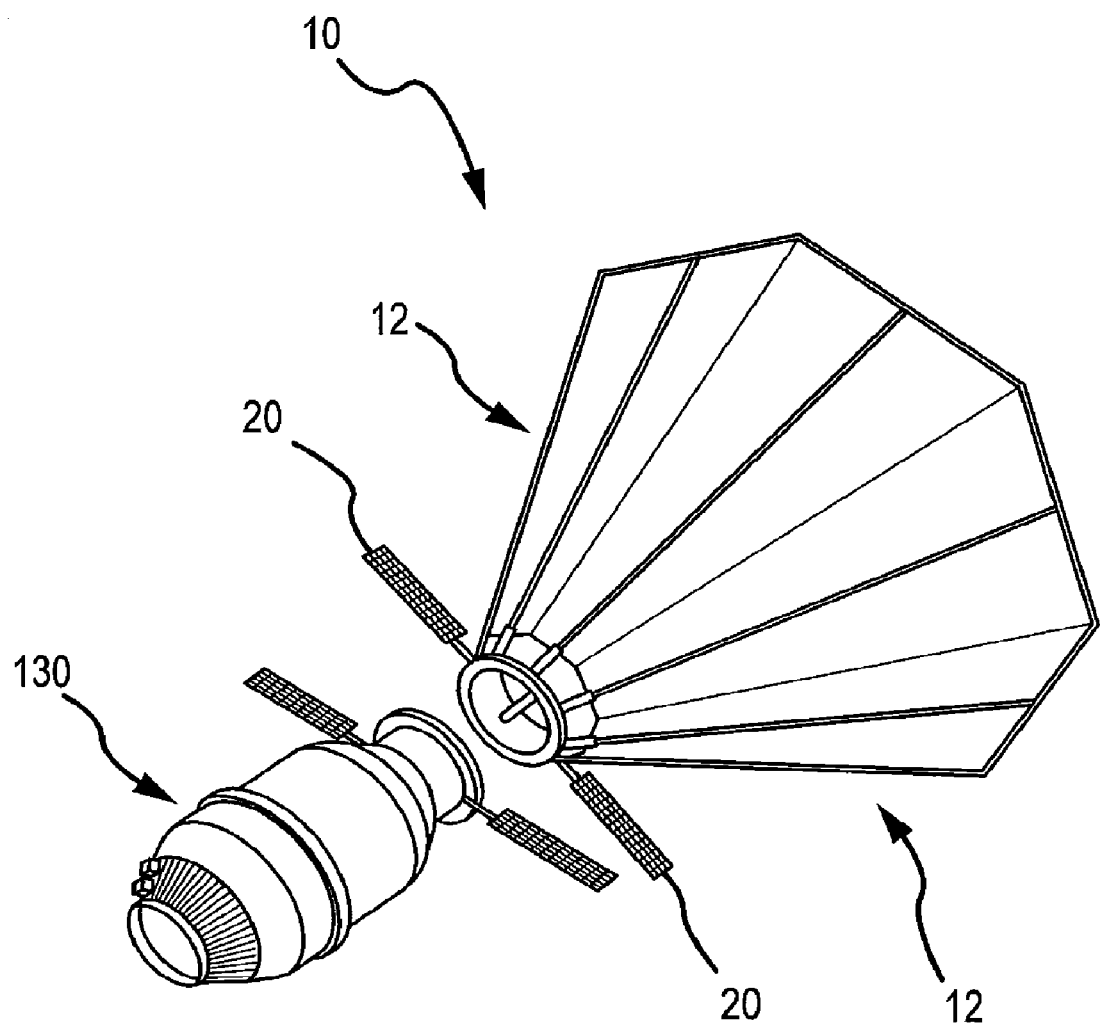
FIG. 17 is a perspective view of the depot of the present invention as it prepares to dock with another space vehicle.

Referring to FIG. 17, the propellant depot 10 of the present invention is illustrated along with another space vehicle 130, which could be another propellant depot, a propellant delivery vehicle, or a space vehicle that requires fueling/refueling. The respective docking ports of the vehicles are oriented for docking and once docking is achieved, the desired cryogenic fluid transfer operation would take place. Docking is achieved without having to move or shift the sunshield or the solar panels. As shown, the sunshield 12 and solar panels 20 do not block the docking ports thus accommodating docking without further component manipulation.

Figure 18:
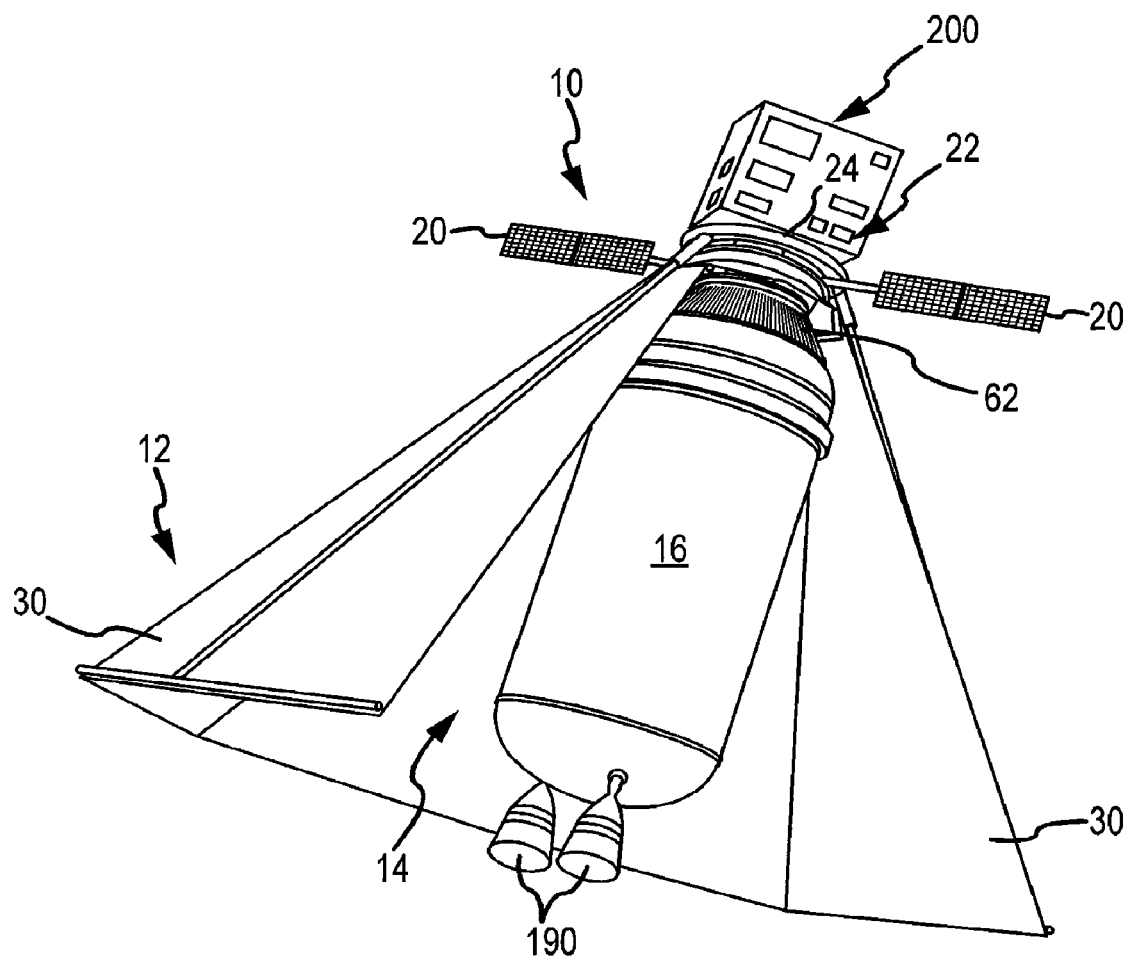
FIG. 18 is another perspective view of another embodiment wherein the depot comprises the upper stage of a launch vehicle with a propulsion system that carries a payload such as a satellite.

FIG. 18 illustrates another embodiment of the present invention wherein the cryogenic propellant depot is incorporated as the upper stage of a launch vehicle in which a propulsion system is used to selectively propel a payload in orbit. A pair of rocket engines 190 is shown as being secured to the exposed end of the tank 16. These rocket engines are fueled from the tank and are designed to handle propulsion for a designated payload. The example payload is shown in FIG. 18 as a satellite 200 that is secured to the docking ring or port 22. The orientation of the sunshield 12 is the same as in the prior embodiment.

Figure 19:
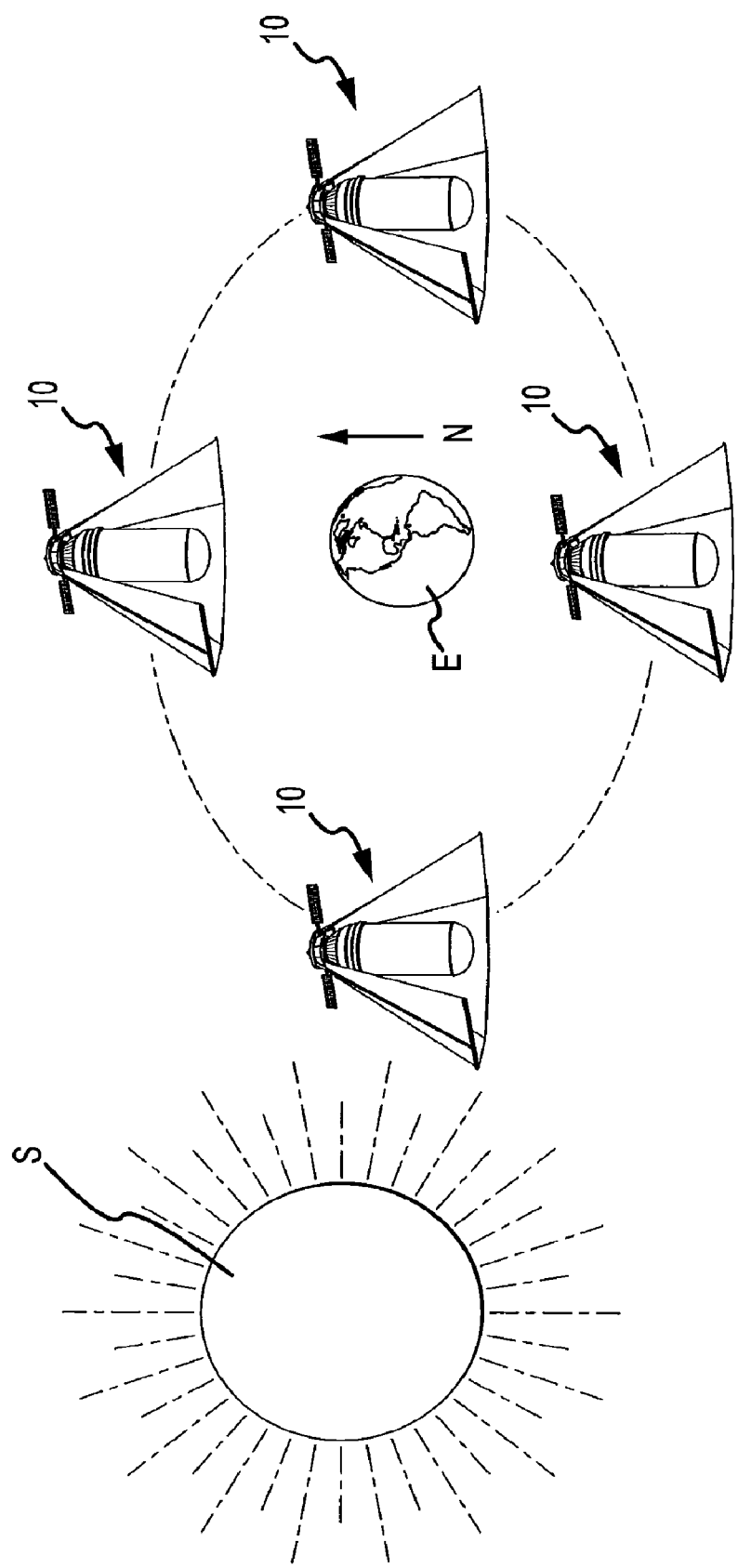
FIG. 19 is a schematic view of the depot in earth orbit such that the depot maintains a north ecliptic orientation to minimize exposure of the depot to solar and earth heating.

FIG. 19 illustrates the depot of the present invention and its north facing elliptical orientation with respect to the earth in a low Earth orbit. As shown, this north orientation helps to prevent heat transfer to the depot by ensuring continuous shielding of the tank from both the sun and Earth. Placement of the depot in deep space, such as at a Lagrange point, where the only significant radiation source is the sun, will benefit from a significantly truncated shield cone with the docking port directed at the sun.

As provided herein, the sunshield of the present invention is integrated with a propellant depot wherein the depot can be used to re-fuel other space vehicles or other propellant depots. The sunshield of the present invention can also be integrated with other configurations such as such as a launch vehicle upper stage carrying a payload. It shall be understood that the sunshield of the present invention is also adaptable to protect other space vehicles and components to include in-space propulsion stages, solar or nuclear thermal propulsion stages, or lunar landers. Because of the relatively simple manner in which the sunshield groups can be attached to a structure such as by the I-Beam mounts, the sunshield assemblies 26 can be selectively placed around a space vehicle to cover space vehicles having differing sizes, shapes and functions. Although a cone shape provides an effective sunshield for a cylindrical tank, the inflatable linear actuators can be oriented so that the panels can be deployed at other angles to best envelop or shield the desired portion(s) of a particular space vehicle.

Although the present invention has been described with respect to the combination of a sunshield and a propellant tank or an upper stage, it is also evident that the sunshield and the tank have separate utility as sub-combinations and therefore, can be considered distinct inventions apart from the combination.

In accordance with one method of the present invention, deployment of a sunshield is achieved to shield a space vehicle from solar and earth radiation. In accordance with the method, the sun shield is stowed in pairs of sunshield panels. A main boom and T-boom are used to deploy the sunshield panel pairs. The final shape of the sunshield is a truncated cone that extends over the length of the tank. The tank is fully enclosed within the sunshield when viewing the depot from the side or an orthogonal direction to the longitudinal axis of the tank.

In accordance with another method of the present invention, a liquid cryogen is made available in earth orbit for transfer to a space vehicle. The liquid is contained within a tank that spins about it longitudinal axis. Gas in the tank is maintained in a core that extends through the center of the tank by centrifugal force generated by the spinning tank. Liquid is readily removed from the tank and does not require a separate liquid/gas separation procedure prior to transfer to the receiving space vehicle since the liquid can be tapped from the tank to avoid ingestion of gas. The tank is maintained at an optimal temperature range with minimal boil-off, thus the tank can cease its spinning motion during docking without compromising an efficient cryogen storage that otherwise might be hampered by excessive boil-off occurring during the transfer.

The use of radial settling for liquid transfer avoids development of propellant management devices (PMD). PMDs take advantage of a liquids surface tension to draw gas free liquid into a tank outlet for fluid transfer and are used extensively for non-cryogen propellant space applications. The extremely low surface tension of cryogenic propellants makes use of PMDs extremely challenging and problematic. Radial settling also allows simple, positive measurement of the volume of propellant on the depot, a serious challenge in a pure zero-G environment.

There are a number of clear advantages to the propellant depot and integral sunshield of the present invention. Interplanetary space missions are no longer limited by launch vehicle performance. Space vehicles can be fueled and refueled by the propellant depot thereby greatly reducing booster requirements for launch vehicles. The sunshield provides an effective and reliable solution to prevent gas boil off within the liquid tank, thereby greatly easing cryogen storage operations. The depot of the present invention is a self-contained, and independently operable system in which liquid transfer can take place directly with a space vehicle without the need for additional equipment or systems to facilitate the transfer. The tank can be launched empty, which thereby minimizes launch vehicle requirements and eliminates the need for the depot to support cryogenic operations in Earth's atmosphere. The entire propellant depot and an integral sunshield may be launched on a single expendable launch vehicle using a medium class rocket, avoiding complicated and costly on orbit assembly. The equipment deck that houses the avionics, power generation, valves, and communication system is isolated from the cryo fluids thereby enabling the equipment deck to operate in a more hospitable environment, while the cryogenic liquid can be maintained at the requisite temperature range. The deployable sunshield mitigates solar and earth radiation heat sources. The open end of the cone allows re-radiation of the energy to the cold of deep space. The propellant depot and integral sunshield are fully assembled at launch, thereby eliminating any orbital assembly requirements.

While the present invention has been set forth with respect to a preferred embodiment for the system, and various structural details for components and sub-combinations, it shall be understood that various other changes and modifications to the invention can be made commensurate with the scope of the claims appended hereto.

What is claimed is:

1. In combination, a cryogenic propellant depot incorporating an integral sunshield, said combination comprising:
   a tank having a sidewall enclosing a quantity of cryogenic liquid therein;
   a bulkhead attached to an end of said tank, said bulkhead having an interior open space defining a thermal isolation reservoir between the tank and the bulkhead;
   a docking port formed on said bulkhead and communicating with an interior of said tank for selectively evacuating liquid in said tank; and
   a sunshield attached to said tank, said sunshield having a first smaller end secured adjacent said docking port, and a second larger end extending away from said first end and having a length that exceeds a length of said tank, said sunshield forming a truncated cone shape to cover said tank when viewing said tank from a side view; and
   wherein said tank has a longitudinal axis, and said tank rotates about its longitudinal axis such that a gas core is formed extending through a center of the tank and along said longitudinal axis.

2. The combination, as claimed in claim 1, wherein: said sunshield extends symmetrically with respect to said longitudinal axis in the truncated cone shape.

3. The combination, as claimed in claim 1, wherein:
   said tank is maintained at a first pressure, and said thermal isolation reservoir is maintained at a second lower pressure.

4. The combination, as claimed in claim 1, wherein:
   said thermal isolation reservoir includes gas dispersed therein, said gas being provided from a gas annulus from said tank.

5. The combination, as claimed in claim 1, wherein:
   said sunshield includes a plurality of layers of materials secured to one another.

6. A method of providing solar radiation shielding for a space vehicle having a cryogenic propellant depot, the method comprising:

proviing a sunshield secured to said depot, said sunshield comprising a first smaller end secured adjacent a docking port of the depot, and a second larger end extending away from said first end and having a length that exceeds a length of said depot when the sunshield is deployed, said sunshield forming a truncated cone shape; and deploying the sunshield symmetrically along a longitudinal axis forming the substantially truncated cone shape surrounding said depot; and rotating said cryogenic propellant depot about a longitudinal axis of said cryogenic propellant depot such that a gas core is formed extending through a center of the cryogenic propellant depot and along said longitudinal axis.

7. In combination, an upper stage of a launch vehicle including an integral sunshield, said combination comprising:

an upper stage of the launch vehicle including a tank having a sidewall enclosing a quantity of cryogen liquid therein;

a propulsion system incorporated with said upper stage including at least one rocket engine for propelling said upper stage;

a bulkhead attached to an end of said tank, said bulkhead having an interior open space defining a thermal isolation reservoir between the tank and the bulkhead;

a docking port formed on said bulkhead and communicating with an interior of said tank for selectively evacuating liquid in said tank; and a sunshield attached to said tank, said sunshield forming a truncated cone shape around said upper stage and extending beyond a length of said upper stage wherein said tank extends along a longitudinal axis of said tank, and said sunshield is deployed symmetrically along said longitudinal axis in said truncated cone shape; and wherein said tank rotates about its longitudinal axis such that a gas core is formed extending through a center of the tank and along said longitudinal axis.

8. The combination, as claimed in claim 7, wherein:
said sunshield covers said tank when viewing said tank at a direction orthogonal to said longitudinal axis.

9. The combination, as claimed in claim 7, further including:
a payload secured to said docking port.

10. In sub-combination, a cryogenic storage tank for a launch vehicle, comprising:

a tank having a sidewall enclosing a quantity of cryogen liquid therein;

a bulkhead attached to an end of said tank, said bulkhead having an interior open space defining a thermal isolation reservoir between the tank and the bulkhead;

a docking port formed adjacent said bulkhead and communicating with an interior of said tank for selectively evacuating liquid in said tank; and an equipment deck attached to said bulkhead via a low conductivity truss structure; and wherein said tank has a longitudinal axis, and said tank rotates about its longitudinal axis such that a gas core is formed extending through a center of the tank and along said longitudinal axis.

11. A method of maintaining a liquid cryogen in space for transfer to a space vehicle comprising:

providing a tank containing a quantity of liquid cryogen therein;

providing a bulkhead secured to the tank and the bulkhead defining a thermal isolation chamber;

spinning the tank about its longitudinal axis to create a gas core for gas in the tank that has boiled;

venting gas from the tank into the chamber;

removing liquid from the tank without interference from the gas core and transferring the liquid to the space vehicle docked with the tank using the gas in the chamber to facilitate transfer of liquid from the tank; and maintaining the gas in the chamber at a pressure less than a pressure in the tank.

* * * * *